Dec. 8, 1942.                    W. C. McMURRY                    2,304,418
                              TRANSPORTATION EQUIPMENT
                              Filed Aug. 12, 1940           3 Sheets-Sheet 1
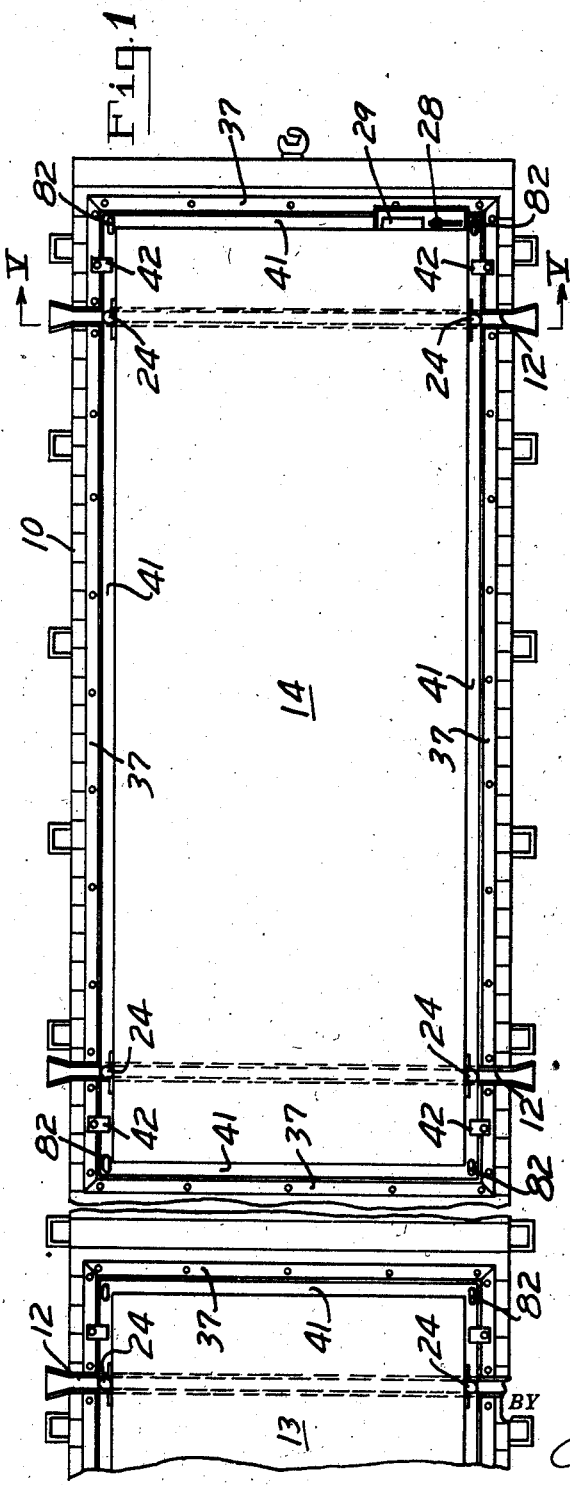
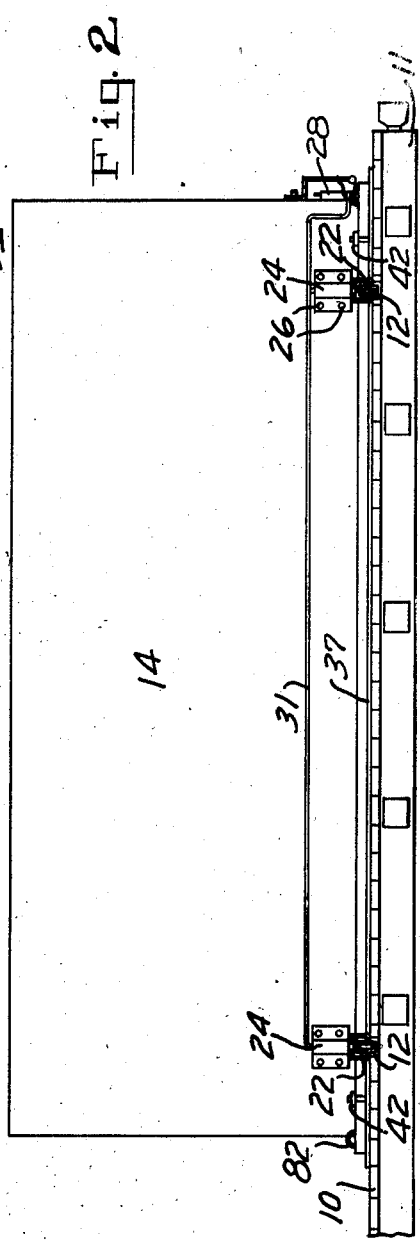
INVENTOR
WILLIAM C. McMURRY
BY
        ATTORNEYS

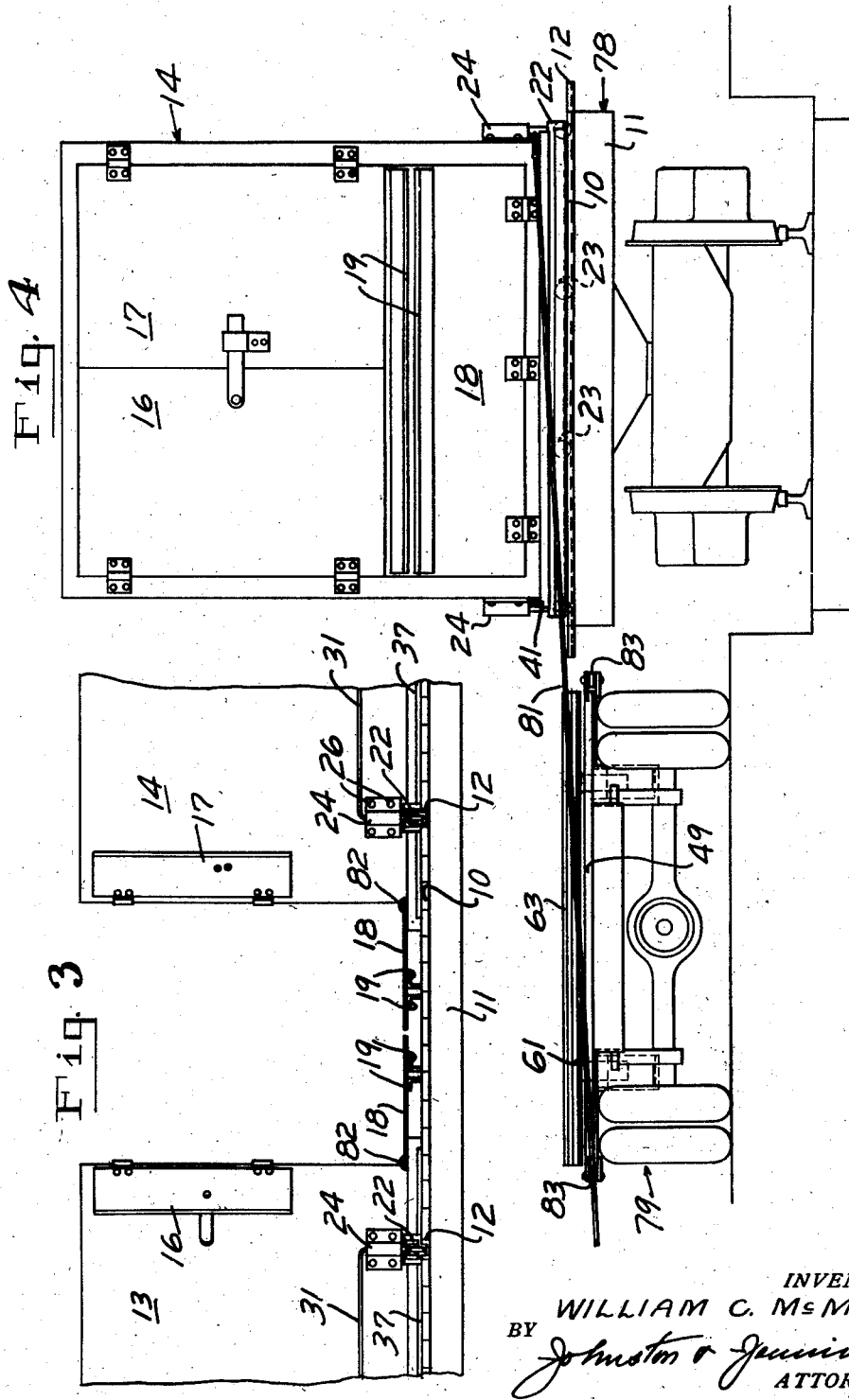

Dec. 8, 1942.　　　W. C. McMURRY　　　2,304,418
TRANSPORTATION EQUIPMENT
Filed Aug. 12, 1940　　　3 Sheets-Sheet 3
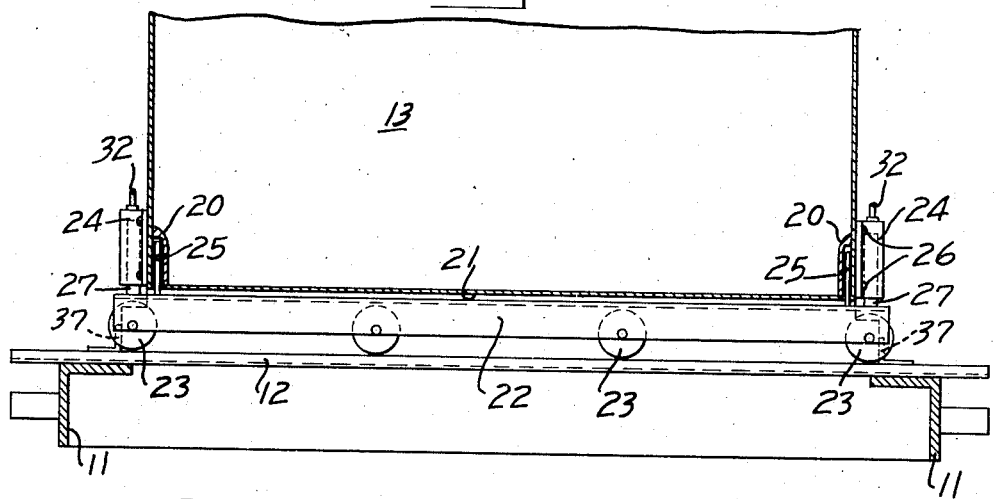
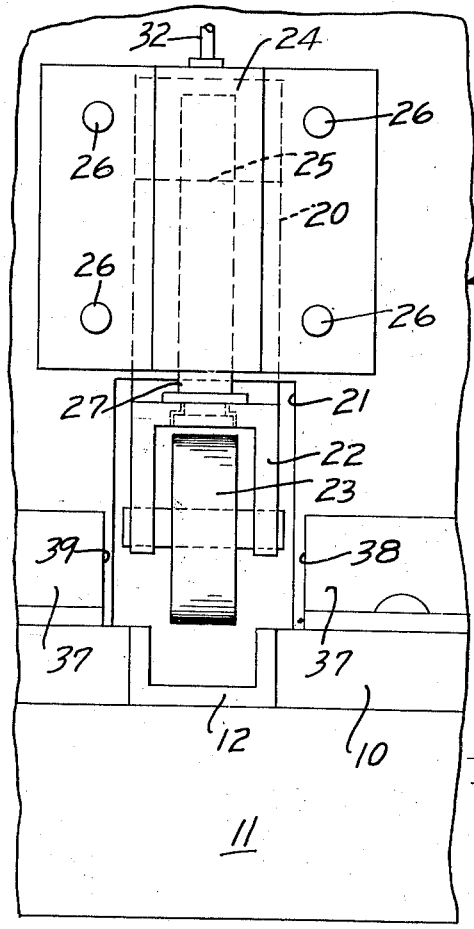
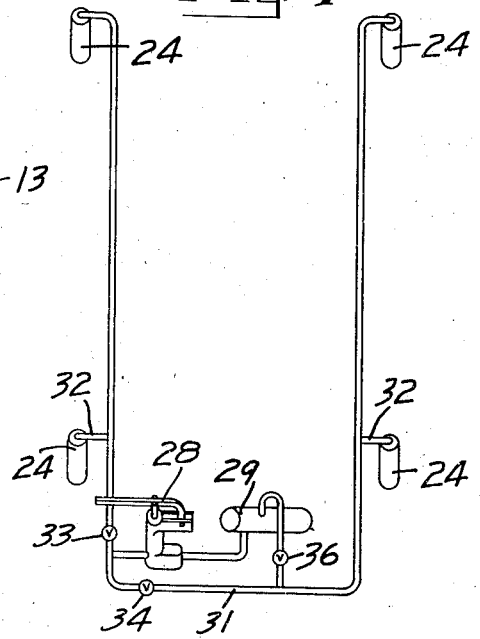
INVENTOR
WILLIAM C. McMURRY
BY Johnston & Jennings
ATTORNEYS Patented Dec. 8, 1942

2,304,418

UNITED STATES PATENT OFFICE 2,304,418

TRANSPORTATION EQUIPMENT

William C. McMurry, Birmingham, Ala.

Application August 12, 1940, Serial No. 352,255

2 Claims. (Cl. 105—366)

My invention relates to transportation equipment, and has for one of its objects the provision of a shipping container embodying means whereby it may be readily moved from place to place and transshiped from a railway to a highway vehicle, and which may be as readily anchored against movement, when desired.

A further object of my invention is to provide transportation equipment including shipping containers, and associated railway and highway vehicles adapted to receive and transport the containers whereby freight pickup, transport and delivery shall be greatly accelerated, and the cost thereof greatly reduced.

A still further object of my invention is to provide a shipping container adapted to be transported either by rail or highway vehicle, together with means for ready transfer of the container from one such vehicle to the other.

Another object of my invention is to provide a shipping container equipped with hydraulically controlled rollers which may be lowered to permit ready transshipment of the container or retracted to anchor it firmly in place on a vehicle.

Another object of my invention is to provide a shipping container adapted for ready transshipment from rail to highway vehicle and which shall include end doors, so disposed as to permit easy loading and unloading where more than one container is employed on a railway vehicle.

Briefly, my invention includes a shipping container including hydraulically operated rollers which may be lowered to permit the ready shifting of the container or retracted to seat it solidly on a vehicle on which it is being transported. The container is equipped with end doors and end gates, and is adapted to be transported on a railway vehicle. The railway vehicle may be an ordinary flat car which will accommodate two or more of my improved containers. The containers may be spaced end to end sufficiently to lower the end gates and open the end doors for loading. The end gates when let down abut to form a substantially level floor for trucking goods into the containers.

The advantages of such a system of transportation is well recognized. So far as I am aware, however, no satisfactory apparatus providing for the collection by highway vehicle, transshipment to railway vehicle, and further transshipment to highway vehicle, has heretofore been provided.

Apparatus embodying features of my invention is illustrated in the accompanying drawings forming a part of this application, in which Fig. 1 is a plan view of a railway vehicle embodying features of my invention and having my improved shipping containers mounted thereon;

Fig. 2 is a side view of the same;

Fig. 3 is a side view showing the ends of two adjacent shipping containers with end gates let down;

Fig. 4 is an end view of a container showing it being shifted from a railway to a highway vehicle;

Fig. 5 is a sectional view taken along the line V—V of Fig. 1;

Fig. 6 is a detail view showing the manner in which the rollers or casters are mounted on the shipping container;

Fig. 7 is a diagrammatic view of the hydraulic apparatus employed with each of the shipping containers.

Referring to the drawings for a better understanding of my invention, I show in Figs. 1 to 5 inclusive a railway vehicle comprising an ordinary flat car having a substantially flat deck 10 mounted on a suitable frame 11. At intervals, extending across the deck, are guide channels 12 which, as shown in the drawings, are mounted in recesses in the deck but which may, on vehicles not especially built for the purpose, be mounted on the deck surfaces.

There are shown carried by the vehicle two of my improved shipping containers 13 and 14. Each of the containers 13 and 14 is of rectangular box-like construction, with end doors 16 and 17 and an end gate 18. In Fig. 3 the doors are shown open and the end gate 18 down. Extending across the end gates are angles 19 forming between them a channel. The angles serve to reinforce the end gates and also to cause them to stand level when let down on the deck of the railway vehicle 10, as shown in Fig. 3. There is thus provided a ready means for loading and unloading the containers 13 and 14 while mounted as shown on a railway vehicle.

Extending across each of the containers 13 and 14, near the opposite ends thereof and over the guide channels 12, are recesses 21 formed in any suitable manner in the bottom of the containers. Mounted in the recesses 21 are channels 22 which extend from side to side of the container, and which have mounted therein at spaced intervals rollers or casters 23, which, when the container is raised with respect to the rollers, afford a ready means for transshipping the containers. At each end of the channel 22 there is a hydraulic jack cylinder 24 secured to the wall of the container, as by means of bolts 26. The piston 27 of each of the hydraulic jack cylinders is connected to the channel 22, whereby when the piston moves downwardly it raises the container off the deck of the vehicle. The container can then be moved laterally of the vehicle deck 10 on to another vehicle or loading platform. In order to prevent lateral strain on the pistons 27 of the hydraulic jack cylinders, I provide vertical guides 20 in the sides of the containers into which extend bars 25 which are secured to the channels 22. These guides counteract the lateral thrusts which may be encountered by the rollers 23 or the channels 22 in moving the containers laterally.

Fluid under pressure for operating the hydraulic cylinders 24 is provided by a manually operable pump 28 mounted on the end of the container, the fluid supplied being drawn from a reservoir 29 and discharged through a main pipe 31 and branch pipes 32 to the cylinders. Valves 33, 34 and 36, when opened, permit the return of fluid to the reservoir 29, and allow the container to settle down on the deck or loading platform where it happens to be. In raising the container, the valve 36 is closed and the valves 33 and 34 opened and the pump 28 operated to supply fluid under pressure to the hydraulic cylinders 24. When it is desired to hold the container in raised position, the valves 33, 34 and 36 are closed to prevent a return flow of the fluid, whereupon the pistons may not retract in the cylinders 24 to permit lowering of the container.

Extending around each of the containers on the deck of the vehicle 10 is a flange 37, which may be the flange of an ordinary structural angle, and which is secured to the deck of the vehicle by any suitable means. The flange 37 is notched, as shown at 38 and 39, to accommodate the guides 12 and the lateral movement of the container off of the vehicle, when desired. When the container is seated on the vehicle within the flange, it prevents shifting of the container due to shocks in transit. Extending around the outside of the container to bear against the flange 37 is a flange 41. Suitable holddown means, such as the clamps 42, are secured to the deck of the vehicle and bear against the flange 41 to prevent vertical displacement of the container in transit.

Referring to Fig. 4, I show one of my improved shipping containers being transshipped from a railway vehicle 78 to a highway vehicle 79. While the transshipment may be accomplished in many ways which will suggest themselves to those skilled in the art, I show simply a cable 81 extending across from the vehicle 79 to the vehicle 78 and attached to the container 14, there being a loop 82 provided on each corner of the container for attaching the cable thereto. See Fig. 1 of the drawings. The deck of the highway vehicle 79 is provided with channel members 61 providing guides 63 which are disposed similarly to the guide channels 12 already described in connection with the deck 10 of the railway vehicle, said guide channels being adapted to receive the supporting rollers 23 on the shipping container when it is being transshipped.

It will be apparent from the foregoing that I have provided an extremely flexible system of transportation by means of my improved equipment. The containers being adapted for ready transshipment from highway to railway vehicles, and from railway to highway vehicles, package shipments may be picked up from various shippers at one shipping point while the container is on a highway vehicle. The container when loaded is transshipped to a railway vehicle and may be opened and partially unloaded en route to its destination, or if the goods are all consigned to a common destination, be sent intact to the destination, transshipped to a highway vehicle, and the packages delivered separately to the consignees from the railway vehicle.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. Transportation equipment comprising a boxlike container having spaced recesses extending the full width of the container transversely of the bottom, channels extending the length of the recesses and mounted in the recesses and movable vertically therein, a series of rollers mounted at spaced intervals throughout the extent of the channels and adapted to support the container, fluid operated jacks for raising the container with respect to the supporting rollers, a vehicle adapted for conveying the container on the surface of which the conveyer rests when the rollers and channels are retracted into the recesses of the container, and guide channels in the deck of the vehicle for receiving the rollers.

2. In combination, a vehicle having guide channels in the deck thereof, a shipping container mounted on the deck of the vehicle, retractable channels extending the full width of the container each having mounted therein supporting rollers at spaced intervals throughout the extent of the channel and adapted to travel in the guide channels when moving the container on the vehicle, and hydraulically operated jacks carried by the container for raising the container with respect to the supporting rollers, said container being adapted to rest on the surface of the vehicle when the rollers and channels are retracted into the recesses of the container.

WILLIAM C. McMURRY.